June 12, 1934.  E. C. SPEIDEN  1,962,261
METHOD AND APPARATUS FOR DISPENSING MATERIALS
Filed March 12, 1932   5 Sheets-Sheet 1
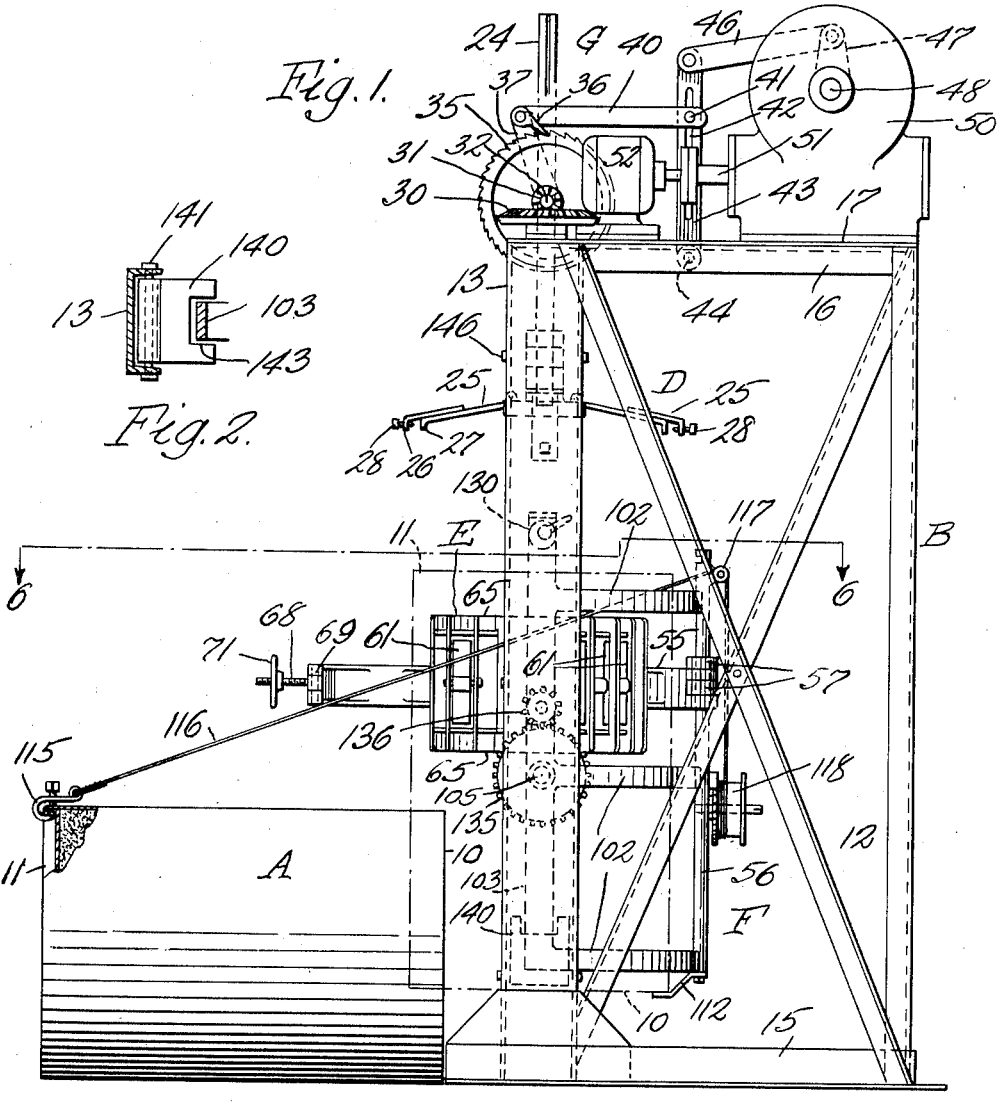
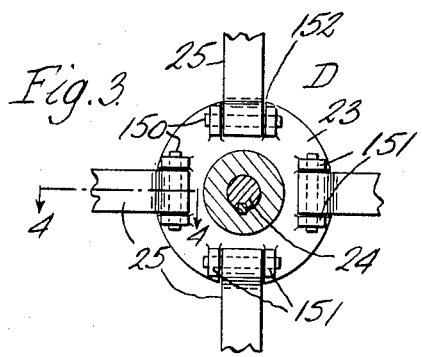
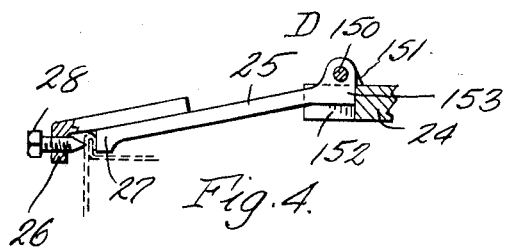
INVENTOR.
Eben C. Speiden
By Parker, Brockwell & Farmer.
ATTORNEYS.

June 12, 1934.                E. C. SPEIDEN                 1,962,261
           METHOD AND APPARATUS FOR DISPENSING MATERIALS
                    Filed March 12, 1932          5 Sheets-Sheet 2

INVENTOR.
Eben C. Speiden
By
Parker, Prichard & Farmer
ATTORNEYS.

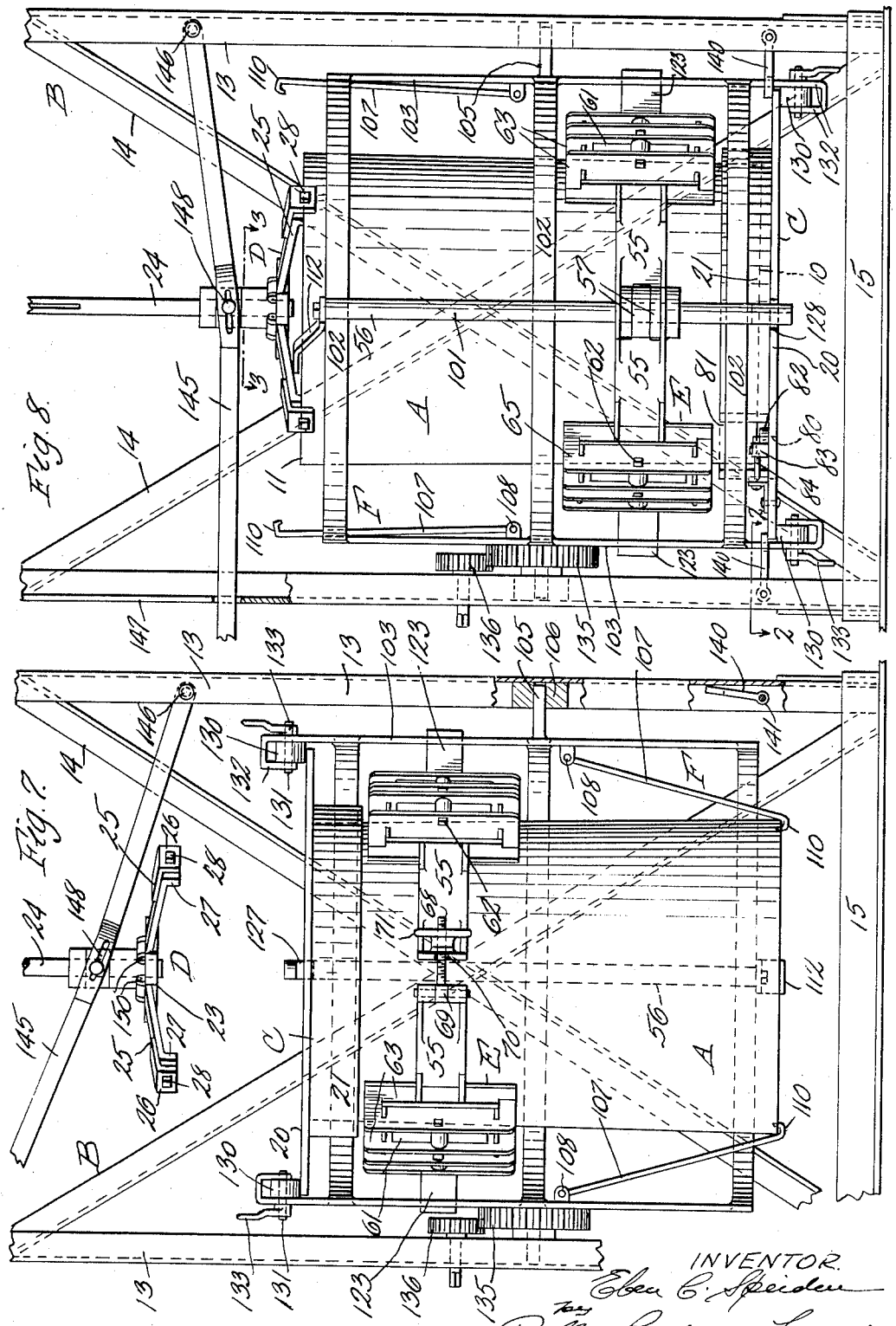

June 12, 1934.  E. C. SPEIDEN  1,962,261
METHOD AND APPARATUS FOR DISPENSING MATERIALS
Filed March 12, 1932  5 Sheets-Sheet 4
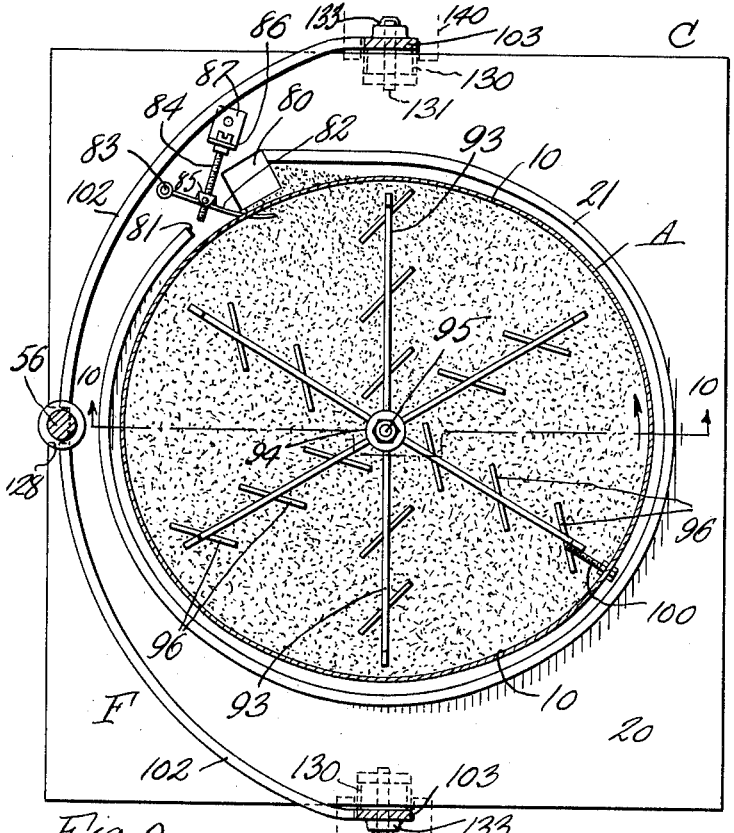
Fig. 9.
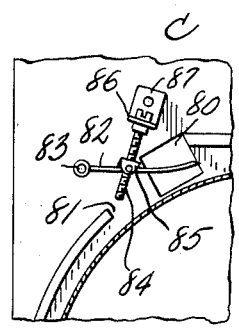
Fig. 11.
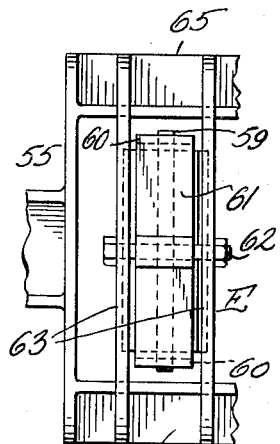
Fig. 12.
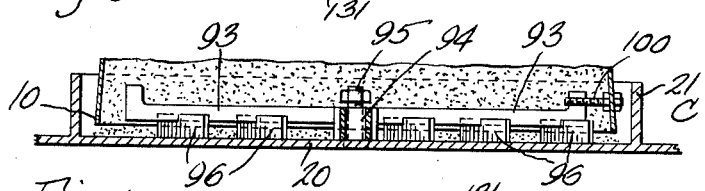
Fig. 10.
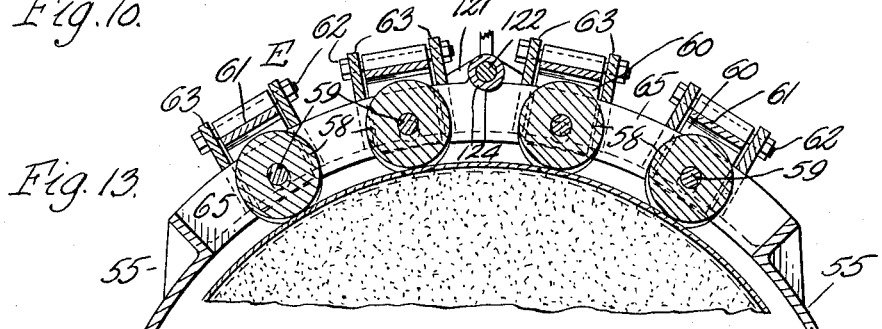
Fig. 13.
INVENTOR.
Eben C. Speiden
By Parker, Brockwer & Farmer
ATTORNEYS.

June 12, 1934.  E. C. SPEIDEN  1,962,261
METHOD AND APPARATUS FOR DISPENSING MATERIALS
Filed March 12, 1932  5 Sheets-Sheet 5
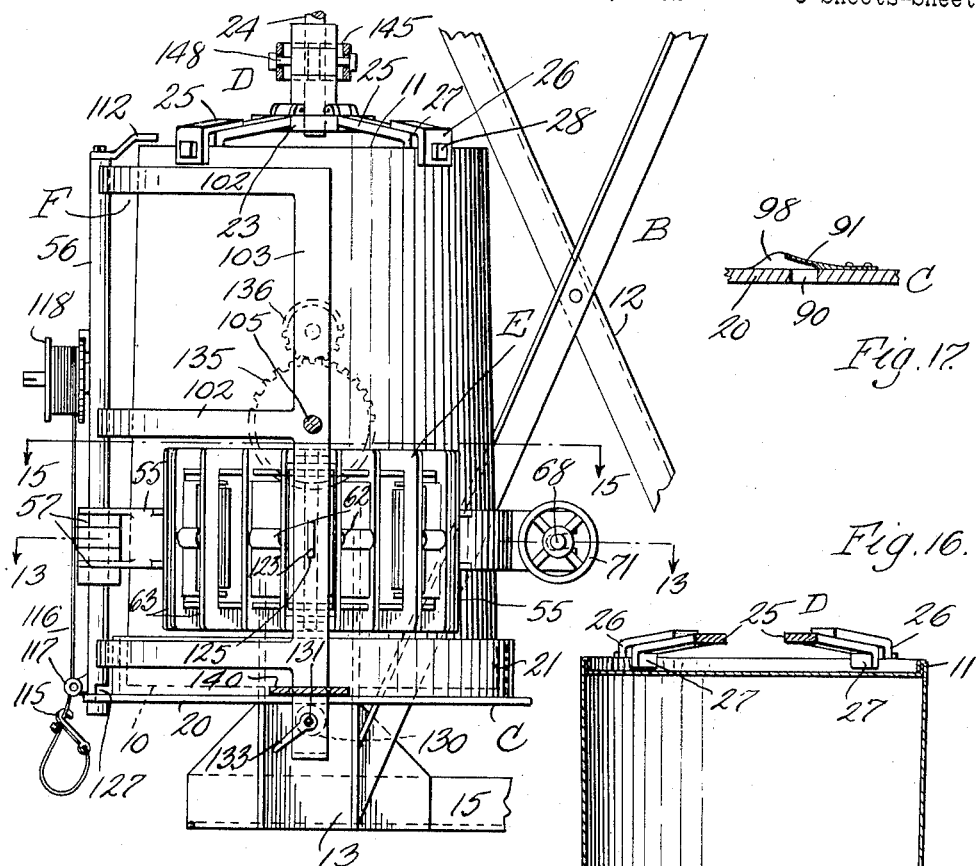
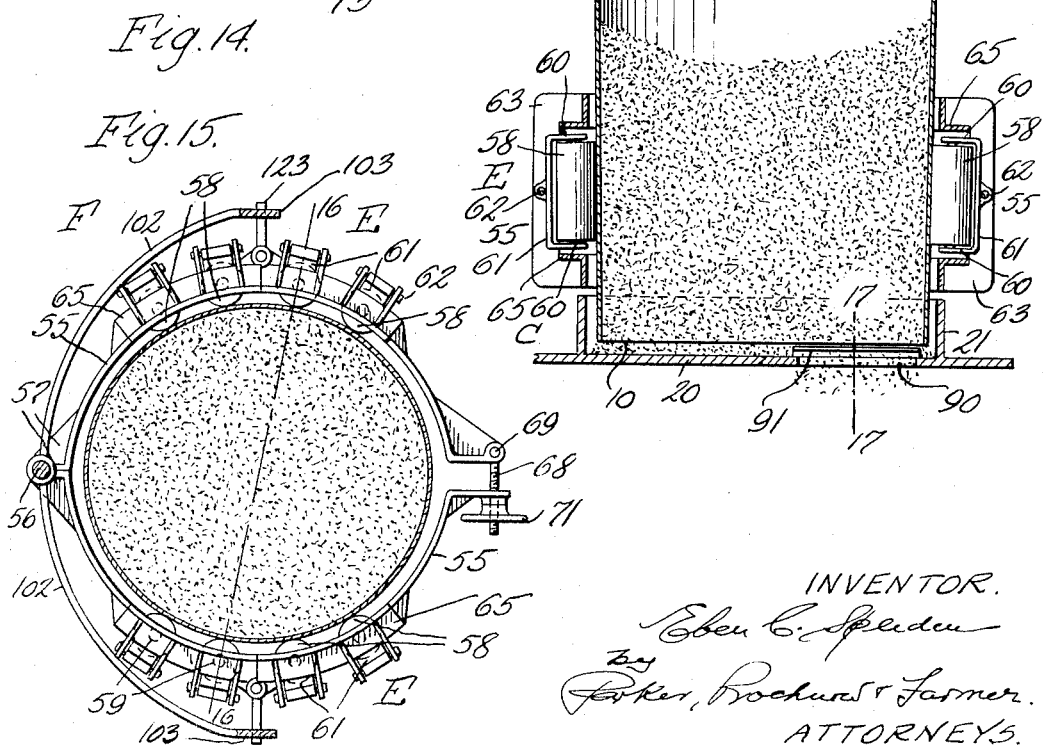
INVENTOR.
Eben C. Speiden
by Parker, Brockhurst & Farmer
ATTORNEYS.

Patented June 12, 1934

1,962,261

UNITED STATES PATENT OFFICE 1,962,261

METHOD AND APPARATUS FOR DISPENSING MATERIALS

Eben C. Speiden, Niagara Falls, N. Y., assignor to Isco Chemical Company, Inc., Niagara Falls, N. Y.

Application March 12, 1932, Serial No. 598,429

21 Claims. (Cl. 221—120)

This invention relates to a method of and apparatus for dispensing finely divided material from the lower open end of a container.

Certain finely divided bulk materials, particularly those which are hygroscopic, have a tendency to arch and cake in a container or feed hopper so that it is difficult to effect the discharge of such a material. This caking or arching is particularly objectionable when it is desired to discharge the material in more or less predetermined or measured quantities by means of a dispensing apparatus or mechanism since the feeding of the material may be entirely interrupted by this caking or arching.

One of the objects of the present invention is to overcome the aforementioned difficulties by the provision of a method and apparatus by the use of which materials of the character stated will be effectually loosened or dislodged from a container, so that the material can be discharged therefrom in desired quantities without the necessity of handling the material.

Other objects are to provide apparatus with which pressure may be applied exteriorly to the side wall of a container in a manner to deflect said side wall out of its normal form while the container is being rotated about its axis so that the deflection or flexing of the side wall is performed progressively and circumferentially thereof, whereby the arching and caking of the material is broken up successively in different radial directions, and the material is consequently effectually dislodged; also to provide apparatus of this sort in which the dislodged material can be discharged in regulated quantities, either continuously or intermittently as desired.

While the foregoing objects are applicable to apparatus of this sort, which may include a cylindrical container as a part of the apparatus itself, it is desirable that such apparatus should be adaptable for use with closed or sealed drums or cylindrical containers such as are shipped from one place to another, and which permits such containers to be mounted in the apparatus and the material discharged therefrom without handling the material.

Other objects, therefore, are to provide an apparatus for this purpose with which containers of the character stated can be moved from a recumbent position and erected in the apparatus in such position that the upper end thereof can be removed, the end thus opened temporarily closed, and the container inverted or reversed end for end, so that the pressure for deflecting the sides of the container can be applied, and the container rotated axially, as before, to effect the dislodgment and discharge of the material; also to provide an apparatus of this sort with which the container can be suspended or otherwise supported relatively to the pressure means while effecting either continuous or intermittent rotation of the supporting means and the container.

Various other objects and advantages of the invention, and the novel features thereof will be particularly pointed out in connection with the appended claims.

An embodiment of the invention with which the above objects and advantages may be obtained is illustrated in the accompanying drawings, in which:

Fig. 1 is a side elevation of an apparatus, embodying this invention and by which my method may be practiced, showing the parts thereof in position to receive a cylindrical container of finely divided bulk material, the latter being illustrated in full lines in a recumbent position, and in broken lines in an erect position;

Fig. 2 is a fragmentary, horizontal section thereof on line 2—2 of Fig. 3;

Fig. 3 is a fragmentary, horizontal section of a portion of the container gripping and suspending means, on an enlarged scale and taken on line 3—3 of Fig. 8;

Fig. 4 is a fragmentary vertical section thereof on line 4—4 of Fig. 3;

Fig. 7 is a fragmentary front elevation of the apparatus, showing a container supported in erect position therein, preparatory to turning the same end for end;

Fig. 8 is a similar view thereof after the container and a movable frame in which it is supported has been inverted, and the suspending and rotating means attached to the closed end thereof;

Fig. 9 is a horizontal sectional view of the apparatus, showing the means for feeding or moving the material at the lower open end of the container, and illustrating one method of discharging the material;

Fig. 10 is a fragmentary vertical section thereof on the line 10—10, Fig. 9;

Fig. 11 is a fragmentary sectional plan view, showing the discharge means of Fig. 9 in an inoperative position;

Fig. 12 is a fragmentary side elevation, on an enlarged scale, of a portion of the pressure means used for deflecting the side wall of the container;

Fig. 13 is a fragmentary horizontal section, on an enlarged scale, of the pressure means in operative relation to the container and taken approximately on the line 13—13 of Fig. 14;

Fig. 14 is a fragmentary side elevation, partly in section, showing a container and the adjacent parts of the apparatus in operative position for effecting the dislodgment and discharge of the material from the container;

Fig. 15 is a fragmentary horizontal section thereof taken approximately on the line 15—15, Fig. 14;

Fig. 16 is a fragmentary vertical section thereof, taken on the line 16—16, Fig. 15 and showing different means than that illustrated in Figs. 9 and 11 for discharging the dislodged material.

Fig. 17 is a fragmentary, vertical section, on an enlarged scale, on line 17—17, Fig. 16.

Figure 5:
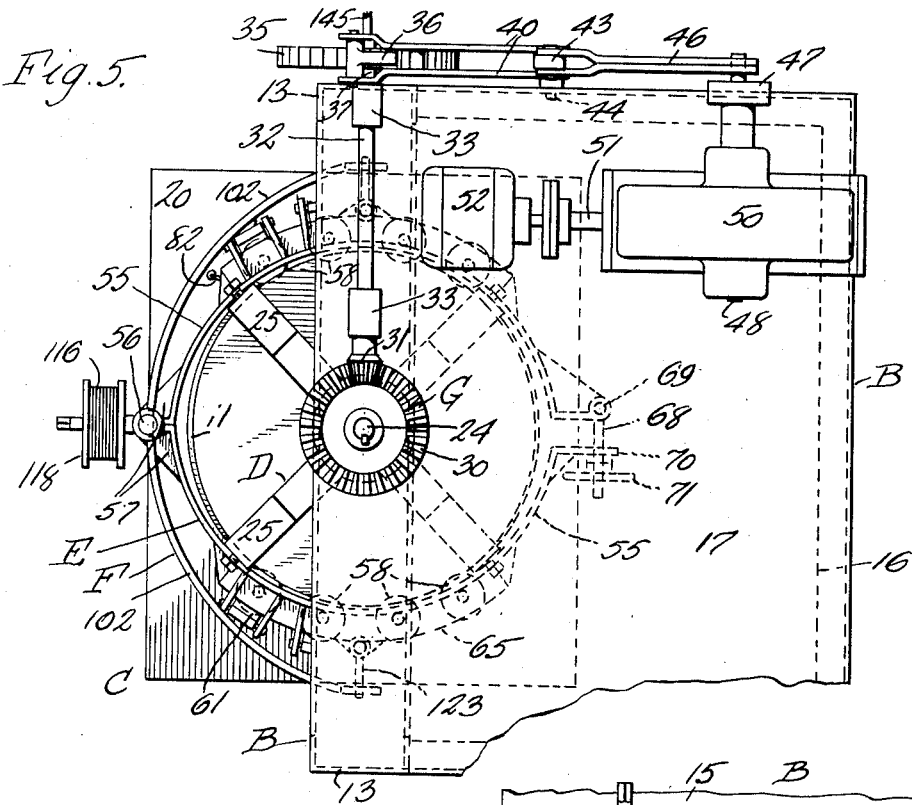
Fig. 5 is a top plan view of the apparatus.

Viewing the invention broadly, several of the important features thereof can be employed in connection with an apparatus in which the cylindrical container for the material may form part of the apparatus itself. Describing first these broader features, reference may be had to Figs. 2 to 5, and 8 to 16, inclusive.

The illustrated apparatus by which the method of this invention is practised comprises a main stationary frame B in which a suitable cylindrical sheet metal container A is supported in an erect position with its lower end 10 open, and a closure member C, which extends in horizontal and preferably spaced relation to said lower open end 10 of the container for supporting the material. The container A is supported in this position by a suspending or supporting device D, which is preferably constructed to engage the opposite or upper end 11 of the container and is vertically adjustable into and out of operative relation thereto.

The apparatus further includes suitable pressure means E constructed and arranged to press against the side walls of the container, preferably at opposite sides thereof so as to flex or distort said side walls out of their normal form and thus subject the mass of material in said container to a similar change in form, which results in the breaking up of any arching or caking of the material in the container. Means are provided for effecting relative rotation between the container A and the pressure means and the closure member C in order to apply the deflecting or distorting pressure progressively circumferentially of the container.

In the arrangement illustrated, the pressure means E and the closure member C are retained in stationary operative positions and the container A rotated relatively thereto. Suitable drive mechanism G, mounted upon the top of the stationary main frame A, is provided for rotating the container, being operatively connected to rotate the container gripping and suspending means D.

The main frame B can be of any suitable construction, being fabricated, in the arrangement illustrated, of standard stock bars or rails, and the like parts. It includes opposite upright side members 12, each of which is provided at the front end thereof with a strong, vertical post or channel 13. The side members 12 may be connected at the rear by diagonal braces or cross members 14, at the bottom by a skeleton base frame 15, and a similar top frame 16. The frame 16 supports a plate 17 upon which is mounted the driving mechanism G. The front of the frame B is left open and substantially unobstructed.

The closure member C, before mentioned, preferably comprises a relatively stationary horizontal plate 20 having a flange or guard 21 secured to one face thereof and preferably curved to conform to the elliptical, distorted open end 10 of the container A, as shown clearly in Fig. 9.

The gripping and suspending means D can be of any suitable construction or arrangement preferably adapted to engage the upper end 11 of the container A so as to support the container in the manner described. In the construction illustrated, said means D comprises a central hub 23 preferably arranged concentric with the axis of the container A, and which is secured to the lower end of a vertical counter-shaft 24. Mounted upon the hub 23 and extending radially therefrom is a plurality of arms 25 provided at their extremities with suitable means for gripping or clamping the container, such, for example, as depending fingers or parts 26 and 27 arranged to engage or straddle the edge or chime of the container and be detachably secured thereto by clamping screws or other fastening devices 28. Any other means for gripping this end of the container may be employed, if desired.

For rotating the container gripping and suspending device D, the upper end of the vertical shaft 24 is splined to a bevel gear 30 journalled upon the top plate 17, the splined connection being such as to permit the shaft and gripping device D to be raised and lowered to the desired extent. A beveled pinion 31, fixed upon a horizontal shaft 32, meshes with the gear 30, and the shaft 32 is journalled in bearings 33 on the top plate 17. See Fig. 5.

While the gripping device D can, if desired, be continuously rotated through the connections described, it is frequently desirable to rotate the same and the container intermittently in order to better regulate the discharge of the material from the container A, as will be described. Accordingly, the mechanism G, as shown, includes a ratchet wheel 35 fixed upon the shaft 32 and a ratchet or pawl 36 mounted upon the outer end of an oscillating arm 37, the other end of which is pivoted or journalled on said shaft 32 adjacent the ratchet wheel 35. The oscillation of the pawl 36 and the consequent intermittent rotation of the ratchet wheel 35 is effected by means of a link 40 pivoted at one end to the arm 37. The opposite end of this link is secured by a suitable pivotal connection 41 to an upright lever 43 which is pivoted at its lower end 44 upon the frame B. A link 46 pivotally connects the upper end of the lever 43 with a crank arm 47 on a shaft 48 of a suitable speed reducing unit 50. This unit 50 is operatively connected by a shaft 51 to a suitable source of power, such as an electric motor 52 fixed upon the top plate 17 of the frame B. It will be seen from the foregoing that the rotation of the shaft 48 and its arm 47 will cause a reciprocation of the link 40 with each stroke of which, in one direction, the ratchet wheel 35 is turned a part of a revolution by the engagement of the pawl 36 therewith. The stroke of the link 40, and consequently, the amount of the rotation of the container A can be varied as desired by arranging the pivotal connection 41 of the link 40 in a slot 42 in the lever 43 and adjusting said pivot towards or from the pivot 44 of said lever 42. Any other suitable intermittent drive mechanism could be used in place of that described.

The container deforming means E includes horizontal arms or members 55, preferably two in number, one of which is arranged at each side of the container A, preferably near the open end thereof, so as to swing into and out of operative engagement with the side wall of said container. For this purpose, each arm 55 is pivoted upon a vertical post 56 by means of hinge portions 57. Each arm 55 is provided with a plurality of pressure elements adapted to be forcibly pressed against the side wall of the container to deflect or bend the same inwardly, the elements at one side or on one arm being opposed to the elements on the other arm so that the opposite portions of the side wall engaged thereby are forced inwardly while portions of the side wall between the two sets of elements, by reason of the flexibility of the side wall, are distended outwardly with relation to the axis of the container. Thus the portion of the wall of the container adjacent to the open end thereof becomes more or less elliptical in cross section, as shown in Figs. 9 and 15. Since the pressure devices are arranged adjacent the lower or open end of the container A, and since such deformation of the other end of the container is resisted by the gripping arms 25, and by the head in this end of the container, if the container used is closed at one end, the deflection and consequent elliptical deformation of the container side wall will be greatest at the lower end 10, and will diminish gradually towards the upper end 11 thereof where the side of the container maintains an approximately circular cross section.

In the construction shown, the pressure elements comprise a plurality of rolls or equivalent devices 58 having the axes of their journals or shafts 59 arranged lengthwise of the container A. The opposite ends of the shaft or journal of each roll 58 are mounted in transverse bearing portions 60 of a U-shaped rocker or movable support 61. In order to enable the rolls to adapt themselves to the various contours of the side walls of containers, each rocker is in turn mounted between its upper and lower ends upon a horizontal pivot 62, which may be formed by a bolt or pin having its opposite ends held in radially disposed vertical flanges or webs 63, which are preferably formed integral with the clamping member 55. These webs 63 may be welded to, or otherwise secured or formed integral with, top and bottom spaced horizontal angle members 65, a pair of which is rigidly secured to and forms part of each swinging arm 55. The arms 55 are curved to such an extent that the journals 59 of the rolls 58 are disposed on an arc, the radius of which is greater than the radius of the container A so that when the rolls 58 are in operative engagement with the latter, the portions of the side wall of the container engaged by the rolls are deflected to conform approximately to this arc of greater radius. As shown, particularly in Figs. 13 and 15, a portion of each roll 58 projects inwardly beyond the inner upright face of the arm 55 upon which it is mounted so that the arms 55 themselves do not come into contact with the container. Any other means for mounting the rolls on the pressure arms 55 may be employed.

In order to permit the rolls 58 to engage with the side wall of the container with sufficient pressure to deflect the same as described, the free ends of the arms 55 are provided with suitable means for drawing the arms forcibly together. The means shown comprises a screw or threaded rod 68 pivoted at 69 to the offset end of one of the arms so as to swing into a notch 70 in the corresponding offset end of the other arm. The screw 68 is provided with a hand wheel 71 which, when engaged with the outer side of the end of the other arm and turned in the proper direction, draws the arms towards each other, and the rolls 58 against the container. Since the rockers 61 in which the rolls 58 are mounted are arranged on horizontal pivots 62 in the manner described, the rolls will automatically adjust themselves to the inclination of the side wall of the container as produced by the pressure of the rolls, as shown in Fig. 16. This arrangement also permits the rolls to pass over any irregularities or obstructions on the side wall of the container, such as dents, seams, reinforcements, beads, or other deformations in the side wall.

From the foregoing, it will be seen that since the pressure is applied to the side walls of the container at opposite sides thereof, and since the container is rotated relatively to said rolls in the manner described, pressure is applied progressively circumferentially of the container, and portions thereof are alternately moved inwardly or towards the axis and then outwardly or away therefrom. This action breaks up any masses of the material which tend to arch or bind and effectually dislodges the material from the container so that it will fall upon the plate 20 of the support C.

The material can be discharged from the upper surface of the closure member C in any suitable manner. For example, there is shown in Figs. 8, 9 and 11, means arranged at the circumference of the container for effecting this result, while in Figs. 16 and 17, a discharge opening for the material is arranged in the plate 20 directly below the container A.

In the first mentioned construction, the plate 20 of the closure member C is provided with an aperture 80 arranged adjacent an opening 81 in the flange or guard 21 of the closure member. Adjacent to this opening 80 is a deflector or feed device comprising a narrow blade 82 pivoted at 83 on the plate 20 and having an adjusting screw 84 operatively engaging in a swivelled nut 85 on the blade 82, and which has one end secured in an upstanding lug 86 of a bracket 87 pivotally mounted upon the top face of the plate 20. The adjusting screw 84 can rotate in the lug 86 without endwise movement so that, by turning the same in one direction, the blade 82 can be positioned so as to extend inwardly beneath the lower end of the container into the material, and deflect or guide the material to the opening 80 when the container or the material therein is rotated. Adjustment of the screw 84 in the opposite direction will withdraw the blade 82 to an inoperative position, as shown in Fig. 11. It will be obvious that by adjusting this screw the quantity of material discharged can be regulated.

In the construction shown in Figs. 16 and 17, the plate 20 is provided with a radially extending slot or opening 90 with which is associated an inclined blade or deflector 91 mounted upon the top face of the plate 20 and extending obliquely upwards across the slot 90 in a direction opposite to that of the direction of rotation of the container. As a consequence, the dislodged material, in the rotation of the container, is carried to the deflector 91 which diverts small quantities of material downwardly to the opening 90 and projects over the opening sufficiently to prevent the material from flowing freely through the opening 90 when the container and material are not rotating. In both arrangements, small quantities of the material are discharged either through the opening 80 or the opening 90 at short intervals, depending upon intermittent periods of movement of the container as produced by the feed or drive mechanism G.

In order to insure the feeding of the material, particularly when most of the same has been emptied, to the discharge opening 80 or 90 in the closure member, means are provided for positively moving the material near the top face of the platen toward the discharge opening.

The device illustrated for this purpose in Figs. 9 and 10 includes a plurality of radial arms or sweeps 93 which extend horizontally from a central hub 94 loosely pivoted upon a vertical stud or short shaft 95 extending upwardly from and secured to the plate 20. Preferably this hub may move vertically to a limited extent on the stud 95. The lower edges of the arms or sweeps 93 may be disposed in spaced relation to the plate, and are provided with angularly arranged depending blades or scrapers 96, the bottom edges of which contact with or rest upon the top face of the plate 20. The blades or scrapers 96 extend in such relation to the sweeps or arms 94 that, upon rotating said arms in the direction of the arrow, (Fig. 9) the material with which they come in contact is gradually forced outwardly towards the wall of the container. This arrangement is effective in insuring proper feeding of the material to the discharge means shown in Figs. 9 and 11, and the same or other means may be employed in connection with the construction shown in Figs. 16 and 17, in which case the radial arms 93 without the blades 96 could be used. Since the rotary sweeps are mounted so as to have vertical movement upon the stud 95, the sweeps can pass freely over the upwardly extending deflector 91 of the construction shown in Figs. 16 and 17, which deflector preferably has cams 98 or other guide means arranged at each end thereof to enable the blades or scrapers 96 to ride easily over the deflector 91.

The feed means or sweeps 93 can be rotated in any suitable way, but are preferably turned with and by the rotation of the container A itself. For this purpose the container has an inwardly projecting part, such as a bolt or pin 100, which is suitably secured to the container and extends into contact with an end of one of the sweeps, as shown in Figs. 9 and 10, thus turning the sweeps with the container.

In order to adapt the apparatus for use with shipping containers or drums of the kind in which material of this kind is usually packaged, and to avoid handling the material to remove the same from its original container, means are provided whereby these original containers can be positioned in the apparatus so as to permit one end to be opened or removed, and then closed temporarily by the closure means. The container is then turned end for end for the discharge of the material. The apparatus can be placed in condition for permitting the removal of an emptied container and the insertion of another filled container. For this purpose a movable upright frame or cradle F for the container is provided, which is open at one side, namely the front of the apparatus. This cradle or frame F in the construction shown, includes the post or pivot member 56 upon which the pressure arms 55 are carried. Spaced horizontal arcuate side members 102 extend laterally and forwardly from opposite sides of the post 56 and are connected at their extremities by upright side bars 103 which are preferably positioned at the inner sides of the frame B adjacent the upright channels 13 thereof. The cradle F is preferably mounted to swing or rotate on the stationary frame B and for this purpose is provided between its upper and lower ends with laterally extending trunnions or pivots 105 which are journalled in suitable bearings 106 in said stationary side members 13 so that the cradle F can be turned end for end with respect to the frame B.

The cradle F is shown in its container receiving position in Figs. 1 and 7, and for initially supporting the container, the cradle is provided with swinging depending arms 107 one end of each of which is pivoted at 108 to an upright 103 of the cradle. The lower ends of the members 107 are provided with hooks 110 which are adapted to extend inwardly to engage a chime or end portion of a container. The lower end of the post 56 has an inwardly extending step or bracket 112, pivotally secured thereto, the free end of which may be swung into approximately the horizontal plane of the hooks 110 so as to form with these hooks spaced supports for the container.

Figure 6:
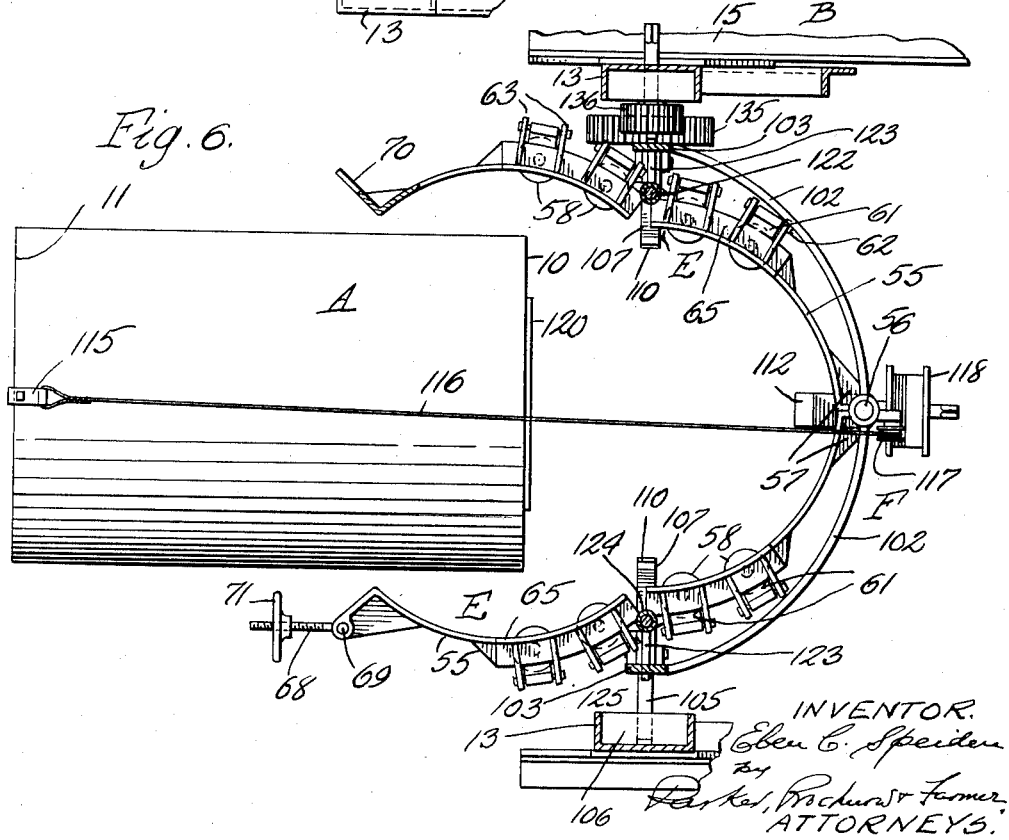
Fig. 6 is a fragmentary horizontal section thereof, taken approximately on the line 6—6 of Fig. 1.

To arrange a container in erect position upon the hooks 110 and step 112, these parts are arranged substantially, as shown in Figs. 6 and 7, the pivotal connections for the arms 107 having sufficient friction to enable said arms to remain in the position indicated. The container is then rolled or placed on its side in front of the apparatus, as shown in Figs. 1 and 6, and a hook 115 on the end of a cable 116 is engaged over the forward end of the container at the upper side thereof, as shown clearly in Fig. 1. The cable 116 extends rearwardly into the apparatus where it passes over a small pulley 117 journalled at the upper end of the post 56 of the swinging frame and downwardly to a windlass or winding drum 118 which, when rotated in the proper direction, takes up the cable 116 and moves the container from the position shown in full lines in Fig. 1 to the position shown in broken lines in that figure. In moving to the upright position, the rear end of the container will come to rest upon the two hooks 110 and the step 112. To enable the container to be so positioned, a cleat or stop 120 may be arranged on the floor or the surface upon which the apparatus is mounted to prevent the container from slipping on the floor, due to the pull on the cable 116. To facilitate the positioning of the container in correct relation to the cradle, the base of the machine is preferably so formed that the container when rolled past one side of the base in close proximity thereto, as shown in Fig. 1, and crosswise of the front of the machine, will be at the correct distance from the hooks 110 and step 112.

To enable the container A to enter between the arms 55 of the pressure means without the necessity of making the apparatus unnecessarily wide, each of these arms is preferably divided intermediate its ends and the two portions pivotally connected, for example by upper and lower bearing lugs 121 connected by a pivot pin 122, as shown clearly in Figs. 6 and 13. By this construction, the outer portions of the arms can be swung to a wide open position as indicated in Fig. 6, after which the container can be moved to its erect position. If desired, each arm 55 may be provided with a further support, in addition to its pivotal connection with the post 56 so as to prevent the arms from sagging. For this purpose, each arm is provided with a lateral extension or plate 123, secured on edge to a spacing tube 124 surrounding the hinge pivot 122 between the upper and lower bearing lugs 121 thereof. The extensions 123 are received and fit in slots 125 in the side uprights 103 of the movable frame. The sleeves 124 can rotate about, or relatively to, the pivots 122 so that the extensions 123 can operatively engage in the slots 125 without binding when the inner and outer portions of the arms 55 are moved relatively to one another.

After the container has been moved into its erect position in the cradle, as just described, it is locked or secured in this position by securing the ends of the arms 55 together by means of the clamping screw 68 and hand wheel or nut 71, and the hook 115 is then released. The head or closure of the drum or container, which is now at the top, can be conveniently removed, and preferably this is done by a suitable cutting tool which cuts the metal just below the chime or any end reinforcement, so that this end of the container will readily be flexed or deformed by the pressure rolls of the arms 55. A hole is then made in the side wall of the container near the upper edge thereof and the pin or bolt 100 is secured to this container, or any other inward projection, adapted to engage one of the arms 93 of the material feed device, may be employed. The closure member C, with the material feed device attached thereto, can then be applied in inverted position to the open top of the container and temporarily secured to the container.

In order to close the upper end of the container, the closure member C, after the blade 82 of the attached discharge device has been moved to the inoperative position of Fig. 11, is inverted so that its flange 21 extends downwardly from the horizontal plate portion 20 thereof, in which condition it is inserted into the upper end of the cradle F, and the depending flange 21 engaged over and about the upper, now open end of the container. Preferably, the upper end of the post 56 is provided with a forwardly facing notch 127, and the rear edge of the plate 20 of the closure member C is formed with a rearwardly facing notch 128, (see Fig. 9) which, when the plate is placed in position over the container, engages in the notch 127 of said post 56, thus locating the plate 20 in correct position. The notch 127 is of a greater height than the thickness of the plate 20 for a purpose which will be described.

In order to securely hold the plate in operative engagement with the open end of the container, suitable pressure or clamping means are provided, which, in the construction illustrated, comprise a pair of eccentrics 130, each of which is secured on a horizontal shaft or pivot 131 journalled in spaced parts 132 at the upper end of each of the side members 103 of the cradle F. The shafts 131 are provided with handles 133 for turning the eccentrics. By turning said handles, the eccentrics may be forced against the top faces of the opposite edge portions of the closure plate 20, thus forcing the latter firmly against the end of the container. The side faces of the eccentrics 130 engage with the adjacent faces of the parts 132 and with the plate 20 with sufficient friction to retain the eccentrics in any position to which they may be set.

By the foregoing arrangement, the container is firmly secured in the movable frame F between the platen C at one end thereof and the hooks 110 and step 112 at its opposite end.

The entire unit consisting of the cradle F, the container A, closure member C and the pressure means E, can now be inverted or turned end for end about the journals 105, a suitable gear 135 and pinion 136, mounted respectively on the cradle and the stationary frame being provided to facilitate the turning. After these parts have been inverted from the position shown in Fig. 7 to that shown in Fig. 8, they may be retained in relatively fixed or stationary relation to the frame B by suitable means, such as a pair of swinging latches or holders 140, pivoted at 141 on the uprights 13 of the stationary frame. The outer or free ends of the plates 140 are notched or forked, as shown at 143. When not in use, these devices 140 extend upwardly between the flanges of the members 13 where they are out of the way, and after the cradle has been moved to the inverted position, the holders or retaining devices 140 are swung downwardly about their pivots 141 so that the forked ends 143 thereof can engage or straddle the adjacent side uprights 103 of the cradle to confine the same from turning on its journals 105. Any other means for holding the cradle against turning may be employed.

Before the container A can be rotated relatively to the pressure means E and closure member C, the hooks 110 must be disengaged from what is now the upper, closed end of the container and clearance must also be provided between the top face of the platen C and lower open end of the container. Accordingly, the operating members or handles 133 are manipulated, first to move the eccentrics 130 sufficiently to lower the closure member C with the container, a sufficient distance to permit the hooks 110 and step 112 to be disengaged and the arms 107 and step 112 to swing away from the container to the inoperative positions shown in Fig. 8.

The gripping and suspending device D is then lowered into operative position and secured to the upper end of the container so as to support the same after which the eccentrics 130 are again moved by the operating members 133 to permit the platen C to be further lowered to an extent to provide the desired clearance between the top of the plate 20 thereof and the lower end of the container. The notch 127 in the post 101 is of sufficient length to permit the described movement of the platen C relatively to said post.

When the discharge means shown in Figs. 9 and 11 is used, the blade 85 is next adjusted so as to extend into the space between the top face of the platen plate 20 and the lower edge of the container, as shown in Fig. 9. When the driving and rotating means are started, the discharge of material, as before described, commences, the bolt 100 engaging an adjacent arm 93 of the feed device.

Any suitable means can be provided for operating and retaining the container gripping and rotating device D in either its upper or lower position. The means shown in the drawings, see particularly Figs. 7 and 8, comprises a lever 145 pivoted at 146 on the stationary frame from whence it extends crosswise of the machine through a vertical slot 147 at the opposite side of the frame B. Between its ends, the lever 145 is attached to the hub 23 of the device D by a pin and slot connection 148. The slot 147 can, if desired, be provided with offset portions or detents, which may releasably engage the lever 145 to hold the same in its upper and lower positions.

When the apparatus described operates upon containers closed at one end, the changing of the shape of the open end into approximately elliptical cross-sectional shape by applying pressure progressively around the side wall, results in a slight up and down, or weaving movement at the upper closed end of the container, engaged by the gripping and suspending device D. In order to permit the closed end of the container to move freely in this manner and thus avoid strains on the gripping and suspending device, the arms 25 are each preferably arranged to have slight independent up and down movement relative to the hub 23 thereof. For this purpose, each arm is secured to the hub 23 by a horizontal pivot 150 mounted in a pair of lugs 151 projecting upwardly from the hub 23, see particularly Figs. 3 and 4. The inner pivoted end of each arm 25 extends into a radial notch or opening 152 formed in the edge of the hub 23 below the pivots 150, and this portion of the arm 25 is provided with a stop or shoulder 153 which is engageable with the inner end of the notch 152. These stops limit the downward movement of the arms 25, which are thereby supported in operative position for proper engagement with the container. By this arrangement, all of the bolts 28 can be initially engaged with the container in the same horizontal plane, but nevertheless each arm 25 can move up and down to a limited extent relatively to the other arms to compensate for any slight weaving action of the part of the container to which it is attached.

By means of the method and construction described, finely divided materials can be automatically and accurately dispensed without danger of having the caking or arching of the material interfere with the accuracy of the feed of the material. This arching or caking is prevented by having any portion of the side wall of the container pressed inwardly intermittently, or whenever the container has been rotated sufficiently to subject such portion to the pressure means. Since the material in the container is rotated with the container because of frictional contact with the side wall of the container and because of the arms 93, the shape of the column of material in the container is changed by the pressure means so that the particles or granules of the material are moved relatively to each other, thus preventing them from adhering to each other, and breaking up such adhesion if the same has already occurred.

This method and apparatus may, for example, be used to advantage in connection with the feeding of disinfectant or deodorizing materials to liquid, as in the treatment of sewage or in the chlorination of water, or in supplying material to chemical processes. The apparatus is also very desirable for use in connection with the dispensing of bleach or similar materials, the dust of which is objectionable or harmful since it is possible by means of this apparatus to handle a drum of such material without producing any dust.

The expression "finely divided material" as herein used is intended to include flaky, granular, powdered and similar materials, and material in lumps if the lumps are friable.

I claim:

1. Apparatus for discharging finely divided material from the open lower end of a container having a flexible side wall, comprising pressure means adapted to engage said side wall, said pressure means acting to flex said side wall out of its normal shape, and means for effecting relative rotation between said pressure means and said container about the axis of the latter to cause said pressure to be applied progressively against different portions of said container wall without permanently deforming said container.

2. Apparatus for dispensing finely divided material from a container, including means for imparting rotation to material in said container, and pressure means for intermittently pressing a portion of the side wall inwardly to prevent caking or arching of said material in said container.

3. Apparatus for dispensing finely divided material from a column of said material confined in a container, including means acting on the exterior of said container for imparting rotation to material in said column, and means for intermittently changing the cross sectional shape of said column to prevent and destroy adhesion of the particles of material to each other.

4. Apparatus for discharging finely divided material from the lower open end of a container having a flexible, substantially cylindrical side wall, including pressure means adapted to change a portion of said side wall into substantially elliptical cross sectional shape, and means for rotating said container relatively to said pressure means.

5. Apparatus for discharging finely divided material from the open lower end of a container having a flexible side wall, comprising pressure means adapted to engage with said side wall, said pressure means acting to flex said side wall out of its normal shape, means for effecting relative rotation between said pressure means and said container about the axis of the latter to cause said pressure to be applied progressively against different portions of said container wall, and a closure member extending across the discharge end of said container to support the material and having means for dispensing material supported thereby.

6. Apparatus for discharging finely divided material from the open lower end of a container having a flexible side wall, comprising pressure means adapted to engage said side wall, said pressure means acting to flex said side wall out of its normal shape, and rotary means engageable with the opposite end of said container for suspending and rotating said container relatively to said pressure means to cause the flexing pressure to be applied progressively against different parts of said container wall to dislodge the material.

7. Apparatus for discharging finely divided material from the open lower end of a container having a flexible side wall, comprising pressure means adapted to engage said side wall, said pressure means acting to flex said side wall out of its normal shape, a closure member extending across the discharge end of said container to support the material, means for feeding the material therefrom, means engageable with the opposite end of said container for suspending the same with its discharge end out of contact with said closure member, and means for effecting relative rotation between said pressure means and said container about the axis of the latter to cause the flexing pressure to be applied progressively and circumferentially against said container wall to dislodge the material.

8. Apparatus for discharging finely divided material from the open lower end of a container having a flexible side wall comprising a closure member disposed beneath and substantially closing said lower end of said container for supporting the material and having means for discharging portions of the material from the apparatus, means for rotating said container, means for flexing the side walls of said container, and a rotatable sweep arranged at said open end of the container and extending into the material and which is rotated to carry material to said discharge means.

9. Apparatus for discharging finely divided material from the open lower end of a container having a flexible side wall, comprising a closure member disposed beneath and substantially closing said lower end of said container for supporting the material and having means for discharging portions of the material from the apparatus, a revoluble sweep journalled on said closure member at said open end of said container and extending into the material, means for rotating said container about its axis, and a part on said container which engages said sweep to impart rotation to said sweep to move the material to said discharge means.

10. Apparatus for discharging finely divided material from the open lower end of a container having a flexible side wall, comprising rolls extending lengthwise of the container and arranged to engage with the side wall thereof, means for pressing said rolls against said side wall to flex portions thereof inwardly, and means for supporting said rolls for movement in longitudinally extending radial planes passing through the axis of said container, whereby said rolls can accommodate themselves to the deflection of the container side walls by said rolls, and means for providing relative rotation of said container and pressing means.

11. Apparatus for dispensing finely divided material from the open end of a container, comprising a stationary frame, a cradle journalled thereon upon a transverse axis and having means for securing the container thereon in an initial position with its open end uppermost, a closure member constructed to engage over said open end of the container to close the same, means for releasably securing said closure member in such position, said cradle, said container and said closure member being movable about said axis to an inverted position, pressure means applicable to the side wall of the container to deflect the same for dislodging the material, and means for discharging the material from said closure member.

12. Apparatus for dispensing finely divided material from the open end of a container, comprising a stationary frame, a cradle journalled thereon upon a transverse axis and having means for securing the container thereon in an initial position with its open end uppermost, including means engageable with the closed end of the container, closure means engageable over the open end thereof to close the same and between which and said means at said closed end the container is releasably held, so that said cradle and said container may be moved about said axis to an inverted position, pressure means applicable exteriorly to the container side wall to deflect the same and dislodge the material, and means associated with said closure means for discharging the material.

13. Apparatus for dispensing finely divided material from the open end of a container, comprising a stationary frame, a cradle journalled thereon upon a transverse axis and having means for securing the container thereon in an initial position with its open end uppermost, a plurality of movable holding devices arranged to engage the closed end of the container, a closure member engageable over the open end of the container, locking means for releasably securing said closure member rigidly in such position that said container is secured between said closure means and said holding devices, said cradle and said container being movable about said axis to an inverted position for the discharge of the material from the open end of said container.

14. Apparatus for dispensing finely divided material from the open end of a container, comprising a stationary frame, a cradle journalled thereon upon a transverse axis and having means for securing the container thereon in an initial position with its open end uppermost, means mounted on said cradle for applying pressure to the side wall of said container to flex said wall to dislodge material therein, said pressure means also serving to retain said container on said cradle, a closure member for the open end of said container and secured to said cradle, means on said closure member for dispensing material from said container when said cradle and parts secured thereto are inverted, and means attachable to said container when said cradle is inverted for rotating said container relatively to said cradle, pressure means and closure member.

15. Apparatus for discharging finely divided material from the open lower end of a container having a flexible side wall, comprising pressure means adapted to engage said side wall, said pressure means acting to flex said side wall out of its normal shape, and means for rotatably supporting the container relatively to said pressure means, and including a driven member disposed axially of the container, a plurality of arms pivoted on and extending radially therefrom for independent movement lengthwise of the container and having means for attachment to the upper closed end of said container, whereby said arms can accommodate themselves to weaving movements of the adjacent end portions of the container due to the deflection of its side walls by said pressure means when the container is rotated.

16. Apparatus for dispensing finely divided material from the open end of a container, comprising a stationary frame, a cradle having an open side, means engageable with a recumbent container of material for moving the same through said open side of, and into, said cradle to an erect position in which the upper end of the container may be opened, means on said frame for engaging the lower end of and supporting said container, means for closing the opened end of the container, said cradle being mounted on said stationary frame to turn end for end with said container and closure means thereon, and means associated with said closure means for discharging the material from the open end of the container.

17. An apparatus for discharging finely divided material from the lower open end of a container having a flexible side wall, including fixed means extending into said side material for removing a portion thereof, means for imparting rotary motion to the material adjacent to said fixed means, including means for rotating said container, means for flexing the walls of said container for changing the cross sectional shape of the column of material therein, and means for varying the rate of said rotation of said rotating means for controlling the rate of discharge of material.

18. In an apparatus for dispensing finely divided material from a container having a flexible side wall, the combination of means for flexing a portion of said side wall at intervals to prevent and destroy adhesion of the particles of material to each other, and means for rotating said container approximately in proportion to the desired rate of dispensing of material.

19. The method of discharging finely divided material from the lower open end of a container having a flexible side wall, which includes first supporting said container in an erect position, removing the upper end thereof, closing the end thereof with a material dispensing closure member, inverting said container and closure member, and applying rotation to the material near the inverted open end of said container to discharge material therefrom and varying the rate of such rotation in accordance with the rate of discharge of material desired.

20. The method of discharging finely divided material from the lower open end of a container having a flexible side wall, which includes first supporting said container in an erect position, removing the upper end thereof, closing that end thereof with a material dispensing closure member, inverting said container and closure member, applying rotation to the material near the inverted open end of said container to discharge material therefrom and varying the rate of such rotation in accordance with the rate of discharge of material desired, and intermittently pressing different portions of said container inwardly to prevent arching and caking of the material in said container.

21. Apparatus for discharging finely divided material from the open lower end of a container having a resilient side wall, including means for rotating said container, and means for flexing the side walls of said container without permanent deformation thereof to change the cross sectional shape of the column of material in the same.

EBEN C. SPEIDEN.